(12) United States Patent
Liebl et al.

(10) Patent No.: US 9,003,918 B2
(45) Date of Patent: Apr. 14, 2015

(54) ROBOT ARM WITH AN ADJUSTMENT DEVICE

(71) Applicant: KUKA Roboter GmbH, Augsburg (DE)

(72) Inventors: Franz Liebl, Aichach (DE); Gernot Nitz, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 62 days.

(21) Appl. No.: 13/863,899

(22) Filed: Apr. 16, 2013

(65) Prior Publication Data

US 2013/0305868 A1 Nov. 21, 2013

(30) Foreign Application Priority Data

May 15, 2012 (DE) .......................... 10 2012 208 098

(51) Int. Cl.
| | | |
|---|---|---|
| *B25J 17/00* | (2006.01) | |
| *B25J 18/00* | (2006.01) | |
| *B25J 17/02* | (2006.01) | |
| *B25J 19/00* | (2006.01) | |

(52) U.S. Cl.
CPC ............ *B25J 17/02* (2013.01); *Y10T 74/20335* (2015.01); *B25J 19/00* (2013.01); *Y10S 901/29* (2013.01)

(58) Field of Classification Search
USPC ......... 74/490.01, 490.05, 490.06; 901/27–29; 403/348, 349
See application file for complete search history.

(56) References Cited

U.S. PATENT DOCUMENTS

| | | | | |
|---|---|---|---|---|
| 5,261,758 A * | 11/1993 | Vranish | ........................ | 403/348 |
| 5,624,364 A | 4/1997 | Zimmer | | |
| 5,777,267 A * | 7/1998 | Szydel | ........................ | 174/72 A |
| 6,431,018 B1 * | 8/2002 | Okada et al. | ................ | 74/490.02 |
| 6,857,174 B2 * | 2/2005 | Morita | ............................. | 29/240 |
| 7,002,102 B2 * | 2/2006 | Munch et al. | ............ | 219/124.34 |
| 7,559,590 B1 * | 7/2009 | Jones | ................................ | 294/2 |
| 7,836,789 B2 * | 11/2010 | Haniya et al. | .............. | 74/490.06 |
| 7,959,399 B2 * | 6/2011 | Horning et al. | ................ | 414/737 |
| 8,029,229 B2 * | 10/2011 | Aiken | ............................ | 414/729 |
| 8,221,050 B2 * | 7/2012 | Kent | ......................... | 414/744.5 |
| 8,336,419 B2 * | 12/2012 | Kent | ......................... | 74/490.05 |

(Continued)

FOREIGN PATENT DOCUMENTS

| | | |
|---|---|---|
| DE | 9313310 U1 | 11/1994 |
| DE | 69200994 T2 | 5/1995 |
| DE | 29810345 U1 | 8/1998 |

OTHER PUBLICATIONS

German Patent Office; Search Report in German Patent Application No. 10 2012 208 098.8 dated Jan. 14, 2013; 5 pages.

*Primary Examiner* — Justin Krause
(74) *Attorney, Agent, or Firm* — Wood, Herron & Evans, LLP

(57) ABSTRACT

The invention relates to a robot arm of an industrial robot. The robot arm includes a flange provided to secure an end effector and several sequentially-positioned members connected by means of links, of which one of the members is mounted immediately before the flange, and the flange is mounted to rotate with respect to an axis relative to this member. To adjust the flange with respect to the member mounted immediately before the flange, the robot arm comprises an adjustment device that includes a base carrier is detachably attachable to the flange particularly by means of screws, with an adjustment means disposed on the base carrier that interacts with a counter-adjustment means disposed on the member mounted immediately before the flange.

13 Claims, 3 Drawing Sheets

(56) References Cited

U.S. PATENT DOCUMENTS

Figure 1:
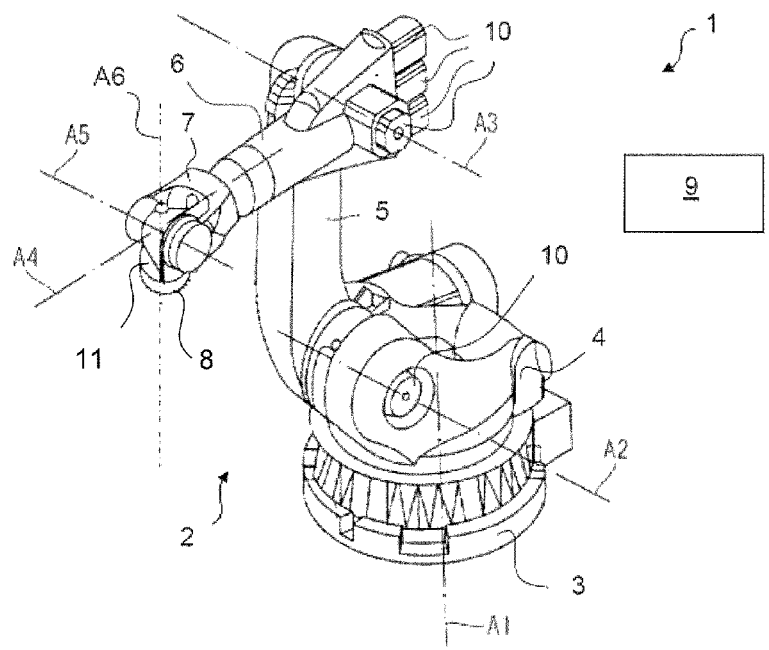

| | | | |
|---|---|---|---|
| 8,459,140 B2* | 6/2013 | Kent | 74/490.06 |
| 2008/0289443 A1* | 11/2008 | Iwai et al. | 74/490.05 |
| 2009/0314113 A1* | 12/2009 | Wang et al. | 74/148 |
| 2010/0103431 A1* | 4/2010 | Demopoulos | 356/622 |
| 2010/0145519 A1* | 6/2010 | Keyl et al. | 700/258 |
| 2010/0237178 A1* | 9/2010 | Nakamura et al. | 242/388.9 |
| 2010/0307279 A1* | 12/2010 | Campagna et al. | 74/490.05 |
| 2011/0106302 A1* | 5/2011 | Long | 700/245 |
| 2011/0239806 A1* | 10/2011 | Markert | 74/490.01 |
| 2011/0259137 A1* | 10/2011 | Long | 74/490.05 |
| 2013/0305868 A1* | 11/2013 | Liebl et al. | 74/490.06 |

* cited by examiner

ROBOT ARM WITH AN ADJUSTMENT DEVICE

The invention relates to a robot arm of an industrial robot. The robot arm comprises a flange and an adjustment device to adjust the flange.

Generally, industrial robots comprise a robot arm and a control device. The robot arm typically comprises a flange to attach an end effector and several sequentially-positioned members connected by means of links, of which one of the members is mounted immediately before the flange, and wherein the flange is mounted to rotate with respect to an axis relative to this member. For satisfactory function of the industrial robot, the positions of the individual members, and particularly the position of the flange relative to the member mounted immediately before the flange, are generally adjusted.

It is the task of the invention to specify a robot arm with an improved adjustment device for adjusting the flange with respect to the member mounted immediately before the flange.

This task of the invention is solved by a robot arm of an industrial robot having
a flange for attaching an end effector,
several members positioned sequentially and connected by means of links, of which one of the members is mounted immediately before the flange, and the flange is mounted to rotate with respect to an axis relative to this member, and
an adjustment device for adjusting the flange with respect to the member mounted immediately before the flange and that has a base carrier that can be detachably attached to the flange particularly by screws, with an adjustment means disposed at the base carrier and the adjustment means interacts with a counter-adjustment means disposed on the member mounted immediately before the flange.

The robot arm according to the invention accordingly comprises the adjustment device, which in turn comprises the attachable base carrier that can be detached from the flange. The adjustment device can thus be largely removed from the remainder of the robot arm, which is advantageous in tight spatial situations between the flange and the member mounted immediately before it.

The adjustment means is attached to the removable and/or releasable base carrier that interacts with the counter-adjustment means for adjustment of the flange. The adjustment means is implemented, for example, as a movable tracer pin with tip or as an adjustment cartridge, and the counter-adjustment means is implemented as an adjustment slot. The adjustment slot or the counter-adjustment means preferably remains fixed to the pertinent member of the robot arm according to the invention, for example to the housing of the member in question.

Both the flange of the robot arm according to the invention and the base carrier of the adjustment device preferably include securing surfaces facing each other in the fastened state of the base carrier. These securing surfaces are particularly circular in shape.

In order to achieve the most accurate adjustment of the flange, it is worthwhile that the base carrier of the adjustment device is secured against displacement in two directions perpendicular to each other, and against rotation about the axis. To achieve this, in one variant of the robot arm according to the invention, the securing surfaces include at least three contact points shaped to make rotation or displacement of the base carrier attached to the flange at least more difficult with respect to the flange. The three contact points are preferably provided on three planes at angles to one another, or on arched function surfaces.

To implement the contact points, the base carrier, for example, can be placed over the flange in the fastened state so that the base carrier is in lateral contact with the flange at one of the contact points. A pin can also extend particularly perpendicularly to the securing surface of the flange that in the fastened state of the base carrier contacts contact surfaces disposed in the securing surface of the base carrier at two of the contact points.

In order to generate the contact force at the contact points in a controlled manner, in one embodiment of the robot arm according to the invention, this robot arm includes at least one elastic element positioned between the base carrier and the flange and that rests on the flange. The at least one elastic element presses particularly the base carrier in the fastened state against the contact points, and/or is particularly attached at one side to the base carrier, e.g., by adhesive. When the screws are tightened, the base carrier is rotated with respect to the flange by means of the friction between the screw heads of the screws and the base carrier such that the base carrier is pressed against the contact points.

The at least one elastic element is preferably dimensioned such that the loads for the contact points are relatively low, which keeps wear relatively low.

The at least one elastic element is made, for example, of rubber. The at least one elastic element is, for example, shaped as a rubber block or as a helical coil.

According to one embodiment of the robot arm according to the invention, adjustment device thereof can include a plate that presses the base carrier against the flange in the fastened state by means of the screws. This plate is preferably shaped as a disk.

According to this embodiment, in order to generate the contact force at the contact points in a controlled manner, according to a preferred embodiment of the robot arm according to the invention, at least one elastic element can be interposed between the base carrier and the plate that rests against the plate. The at least one elastic element particularly presses the base carrier against the contact points in the fastened state. The at least one elastic element is preferably attached at one side to the base carrier or the plate. When the screws or the screw connection for the plate/base carrier/flange are tightened, the plate, which is advantageously shaped as a disk, is rotated with respect to the base carrier by means of the friction between the screw heads and the plate such that the base carrier is pressed against the contact points by increased deformation of the at least one elastic element. The at least one elastic element interposed between the base carrier and the plate results in smaller increase in the contact force at the contact points. This protects the contact surfaces and reduces deformation, thus improving repeatable adjustment accuracy.

The at least one elastic element is made of rubber, for example. The at least one elastic element is shaped as a rubber block or as a helical coil, for example.

Figures 2, 3:
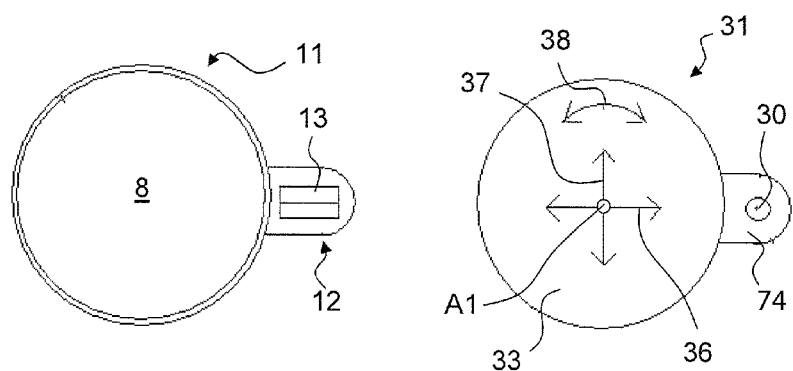
Figure 4:
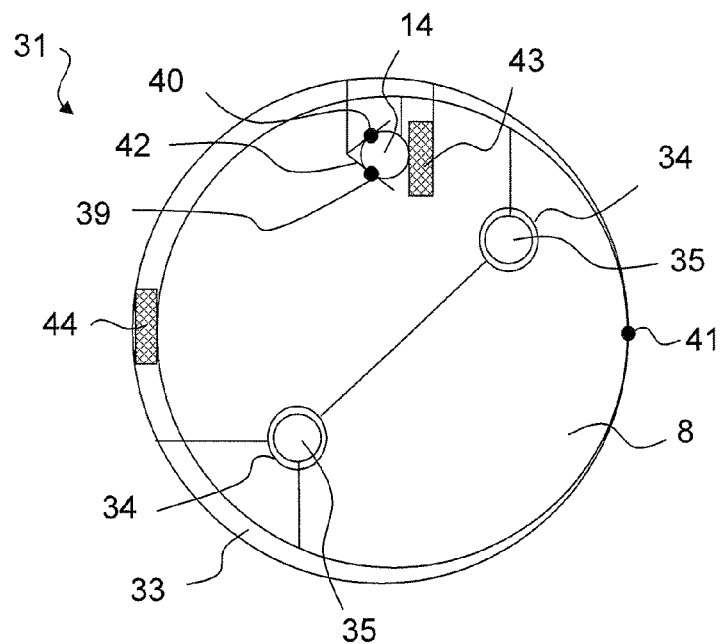
Figure 5:
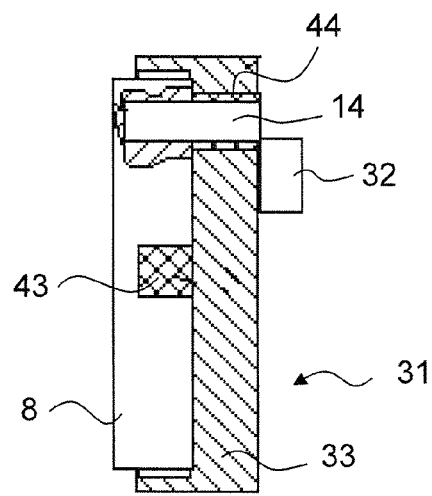
Figure 6:
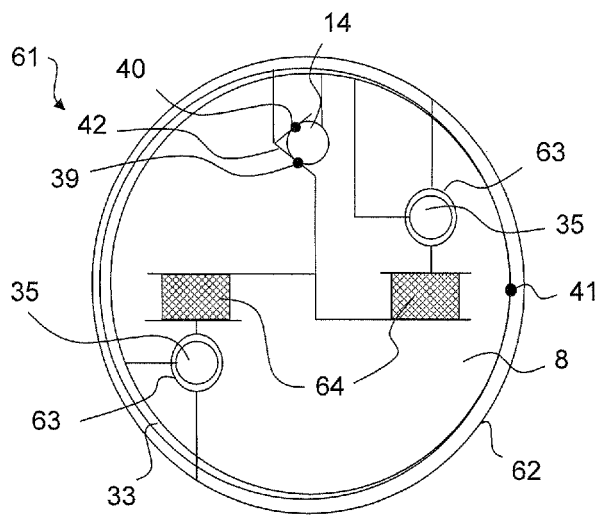
Figure 7:
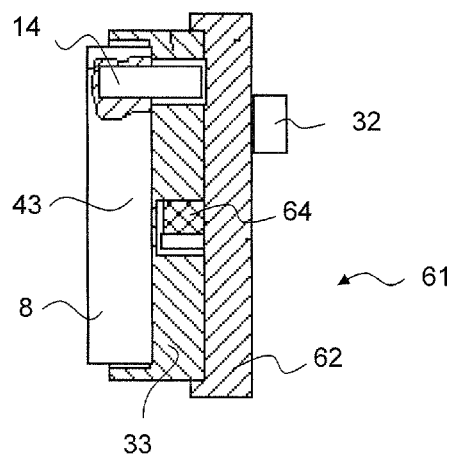

Example embodiments of the invention are shown as examples in the attached schematic Figures. They show:

FIG. 1 an industrial robot with a control device and a robot arm, comprising a flange to attach an end effector, FIG. 2 a top view of the flange of the robot arm, FIG. 3 a top view of an adjustment device to adjust the flange, FIG. 4 a top view of an adjustment device mounted on the flange, FIG. 5 a side view of the adjustment device screwed to the flange in cutaway view, FIG. 6 a top view of an additional adjustment device mounted on the flange, and FIG. 7 side view of the additional adjustment device screwed to the flange in cutaway view.

FIG. 1 shows a perspective representation of an industrial robot 1 with a robot arm 2 and a control device 9.

In the case of this embodiment example, the robot arm 2 comprises several sequentially-arranged members connected by links. These members are particularly fixed or movable frame 3 and a carousel 4 mounted to be rotatable with respect to the frame 3 about an axis A1 extending vertically. Other members of the robot arm 2 in the case of this embodiment example are a pivot arm 5, an extension arm 6, and a robot hand 7 with preferably multiple axes, with a flange 8 to attach an end effector, not shown in detail. The lower end, for example, of the pivot arm 5 is mounted on a pivot-arm bearing head, not shown in detail, on the carousel 4 so that it can pivot about a preferably horizontal axis A2. At the upper end of the pivot arm 5, the extension arm 6 is in turn mounted about a likewise preferably horizontal axis A3. This extension arm at its end bears the robot hand 7 with its preferably three axes A4, A5, A6. The robot hand 7 particularly comprises several members, of which one member 11 is mounted immediately before the flange 8 so that the flange 8 is mounted to be rotatable relative to the axis A6 with respect to this member 11.

In order to move the industrial robot 1 or robot arm 2 thereof, the robot 1 comprises drives, particularly electrical drives, connected to the control device 9 in a conventional manner. FIG. 1 shows merely some of the electrical motors 10 for these drives. A computer program runs on the control device 9 by means of which the control device 9 controls the industrial robot 1 during its operation such that, for example, the flange 8 or a so-called tool center point performs a predefined motion. As necessary, the control device 9 regulates the drives in a manner known to the person skilled in the art. As necessary, the electrical drives are regulated drives, and the control device 9 generates target signals for the regulated drives.

In the case of this embodiment example, it is provided to adjust the flange 8 with respect to the member 11 mounted immediately before the flange 8. FIG. 2 shows a top view of the flange 8 and of the member 11 mounted immediately before the flange 8.

In the case of this embodiment example, an adjustment device 31 shown in FIGS. 3 through 5 is provided for adjustment of the flange 8 with respect to the member 11 mounted immediately before the flange 8, and for adjusting is detachably attached to the flange 8 by means of screws 32 instead of the end effector. FIG. 3 shows a top view of the adjustment device 31, and FIG. 4 shows a top view of an adjustment device 31 disposed on the flange 8, and FIG. 5 shows a cutaway side view of the adjustment device 31 screwed to the flange 8 by means of screws 32.

In the case of this embodiment example, the adjustment device 31 comprises a base carrier 33 comprising drilled holes 34 in order to screw the base carrier 33 to the flange 8. For the screw connection, the flange 8 comprises drilled holes 35 corresponding to the drilled holes 34 of the base carrier 33 and which are provided with counter threads corresponding to those of the screws 32. The base carrier 33 is preferably of metal.

In the case of this embodiment example, the adjustment device 31 comprises an extension arm 74 disposed on the base carrier 33, said extension arm 34 being provided with an adjustment means 30. The extension arm 74 and the base carrier 33 are preferably manufactured as one piece. The adjustment means 30 is, for example, implemented as a movable tracer pin with tip.

In the case of this embodiment example, the member 11 mounted immediately before the flange 8 comprises a hand or extension arm 12, which is provided with a counter-adjustment means 13. The counter-adjustment means 13, which is implemented as a slot for example, is provided to interact with the adjustment means 30 for adjustment of the flange 8. The adjustment means 30 is particularly connected, not shown, to the control device 9 such that said control device 9 can evaluate signals originating from the adjustment means 30 provided for adjustment of the flange 8. The extension arm 12 with the counter-adjustment means 13 is disposed, for example, on the housing of the member 11.

In order to achieve the most accurate adjustment of the flange 8 possible, it is desirable that the adjustment device 31, particularly its base carrier 33, is secured against displacement in two directions perpendicular to each other, shown by double arrows 36 and 37 in FIG. 3, and against rotation about the axis A6, shown by double arrow 38 in FIG. 3. To achieve this in present embodiment example of the robot arm, three contact points are provided, particularly a first contact point 39, a second contact point 40, and a third contact point 41, particularly on three planar and/or curved function surfaces at angles to one another.

In the case of this embodiment example, the first contact point 39 and the second contact point 40 are implemented to be a drift pin 14 firmly affixed to the flange 8, against which the base carrier 33 presses with a slot 42 provided on the base carrier 33. The drift pin 14 extends out of the surface of the flange 8 facing the base carrier 33 in the direction of the axis A6, about which the flange 8 is mounted to be rotatable. The slot 42 is located in the surface of the base carrier 33 facing the flange 8.

The third contact point 41 is implemented, for example, in that the base carrier 33 near the region of the third contact point 41 is placed over the edge of the flange 8. The flange 8 and the base carrier 33 are preferably circular, and the base carrier 33 is placed peripherally over the flange 8.

Particularly the first and the second contact points 39, 40, or the slot 42 and the drift pin 14 are positioned such that the base carrier 33 presses against the drift pin 14 when the screws 32 are tightened. In the case of this embodiment example, the contact force at the contact points 39-41 is generated in a controlled manner by at least one elastic element, particularly by a first elastic element 43 and a second elastic element 44.

The elastic elements 43, 44 are, for example, of rubber and are implemented as rubber blocks, for example. The elastic elements 43, 44 can also be implemented as helical coils.

In the case of this embodiment example, the elastic elements 43, 44 rest against the flange 8 and press the base carrier 33 against the contact points 39-41. Particularly, the first elastic element 43 is located between the flange 8 and the base carrier 33.

The first elastic element 43 is advantageously attached at one side to the base carrier 33 particularly by adhesive.

The second elastic element 43 is located in the region of the base carriers 33, preferably attached at one side, for example, by adhesive in that the base carrier 33 is placed over the flange 8. Particularly, the second elastic element 44 is located in the region of the base carriers 33 lying opposite to the third contact point 41.

When the screws 32 are tightened, the base carrier 33 is rotated with respect to the flange 8 by means of friction between the screw heads of the screws 32 and the base carrier 33 such that the base carrier 33 is pressed against the contact points 39-41. Because of the elastic elements 43, 44, the loads on the contact points 43, 44 are reduced, whereby the wear particularly to the base carrier 33 is reduced.

FIGS. 6 and 7 show an additional adjustment device 61 that can be used to adjust the flange 8 instead of the adjustment device 31 shown in FIGS. 3 through 5. Unless otherwise described, components of the adjustment device 61 shown in FIGS. 6 and 7 are provided with the same reference numbers as those with substantially the same design and function in the adjustment device 31 in FIGS. 3 through 5.

FIG. 6 shows a top view of the adjustment device 61 disposed on the flange 8, and FIG. 7 shows a cutaway side view of the adjustment device 61 screwed by means of screws 32.

In contrast to the adjustment device 31 shown in FIGS. 3 through 5, in addition to the base carrier 33 at which the extension arm 74 with adjustment device 30 is disposed, the adjustment device 61 shown in FIGS. 6 and 7 includes a plate 62 or a disk that presses the base carrier 33 against the flange 8 by means of the screws 32. The plate 62 is preferably circular. The plate 62 comprises the drilled holes 35 of the flange 8 and drilled holes 63 corresponding to the drilled holes 34 of the base carrier 33 through which the screws 32 are guided. When in the tightened state, the screw heads of the screws 32 press against the plate 62, whereby the plate 62 presses the base carrier 33 against the flange 8. The plate 62 is preferably of metal.

The contact forces at the contact points 39-41 in the case of this embodiment example are also generated in a controlled manner by means of at least one elastic element, particularly by two elastic elements 64.

The elastic elements 64 are, for example, of rubber and are implemented as rubber blocks, for example. The elastic elements 64 can also be implemented as helical coils. The elastic elements 64 are, for example, attached at one side, for example by adhesive, to the surface of the base carrier 33 facing toward the plate 62. The elastic elements 64 can also be attached at one side, for example by adhesive, to the surface of the plate 62 facing toward the base carrier 33.

In the case of this embodiment example, two screws 32 are provided for detachably attaching the base carrier 33 to the flange 8. Particularly, two elastic elements 64 are provided, one of which is disposed in the region of one of the drilled holes 34, 63 and the other is disposed in the region of the other drilled holes 34, 63 of the base carrier 33 or the plate 62.

The elastic elements 64 rest against the additional plate 62 and press the base carrier 33 against the contact points 39-41. When the screws 32 are tightened, the plate 62 is rotated with respect to the base carrier 33 by means of the friction between the screw heads of the screws 32 and the plate 62 such that the base carrier 33 is pressed against the contact points 39-41 by increased deformation of the elastic elements 64. Due to the elastic elements 64 interposed between the plate 62 and the base carrier 33, the increase in contact force at the contact points 39-41 is less than in the adjustment device 31 shown in FIGS. 3 through 5. This preserves the contact surfaces between the flange 8 and the base carrier 33 in the regions near the contact points 39-41 and reduces their deformation, whereby the accuracy of a repeated adjustment (adjustment repeatability) is improved.

The invention claimed is:

1. A robot arm of an industrial robot, having
   a flange provided to attach an end effector,
   several sequentially-positioned links connected by means of joints, of which one of the links is mounted immediately before the flange, and the flange is mounted to rotate with respect to an axis relative to this link, and
   an adjustment device to adjust the flange with respect to the link mounted immediately before the flange, the adjustment device including a base carrier that can be detachably fastened to the flange, and an adjustment means disposed on the base carrier that interacts with a counter-adjustment means disposed on the link mounted immediately before the flange.

2. The robot arm according to claim 1, the flange and the base carrier of which each comprise a securing surface that face one another in the fastened state of the base carrier.

3. The robot arm of claim 2, wherein the securing surfaces of the flange and the base carrier are circular in shape.

4. The robot arm according to claim 2, in which the securing surfaces comprise at least three contact points that are shaped at least to reduce rotation and displacement of the base carrier attached to the flange relative to the flange.

5. The robot arm according to 4, whose base carrier in the state fastened to the flange is placed over the flange so that the base carrier is in lateral contact with the flange at one of the contact points and/or a pin extends particularly perpendicular to the securing surface of the flange that, in the fastened state of the base carrier, has contact with contact surfaces on the securing surface of the base carrier at two of the contact points.

6. The robot arm according to claim 4, comprising at least one elastic element disposed between the base carrier and the flange, which rests on the flange, and which presses the base carrier in the fastened state against the contact points.

7. The robot arm of claim 6, wherein the at least one elastic element is attached at one side to the base carrier.

8. The robot arm according to claim 6, in which the at least one elastic element is made of rubber, is configured as a rubber block, or is configured as a helical coil.

9. The robot arm according to claim 1, whose adjustment device includes a plate, which in the fastened state presses the base carrier against the flange by means of screws.

10. The robot arm according to claim 9, including at least one elastic element disposed between the base carrier and the plate, which rests on the plate.

11. The robot arm according to claim 10, in which the at least one elastic element presses the base carrier in the fastened state against the contact points, and/or is attached at one side to the base carrier or to the plate.

12. The robot arm according to claim 10, in which the at least one elastic element is made of rubber, is shaped as a rubber block, or is shaped as a helical coil.

13. The robot arm of claim 1, wherein the base carrier is detachably fastened to the flange by screws.

* * * * *